(12) United States Patent
Shimizu et al.

(10) Patent No.: US 7,092,090 B2
(45) Date of Patent: Aug. 15, 2006

(54) SPECTROPHOTOMETER

(75) Inventors: Etsuro Shimizu, Shioziri (JP); Hitoshi Komine, Hachioji (JP)

(73) Assignee: Olympus Corporation, Tokyo (JP)

( * ) Notice: Subject to any disclaimer, the term of this patent is extended or adjusted under 35 U.S.C. 154(b) by 343 days.

(21) Appl. No.: 10/806,246

(22) Filed: Mar. 23, 2004

(65) Prior Publication Data
US 2004/0196458 A1 Oct. 7, 2004

(30) Foreign Application Priority Data
Apr. 2, 2003 (JP) ............................. 2003-098804

(51) Int. Cl.
*G01J 3/28* (2006.01)
(52) U.S. Cl. .................................... 356/328
(58) Field of Classification Search ................ 356/328, 356/334, 319; 385/14
See application file for complete search history.

(56) References Cited

U.S. PATENT DOCUMENTS 6,249,346 B1 * 6/2001 Chen et al. ................. 356/328
6,657,723 B1 * 12/2003 Cohen et al. ................ 356/328

FOREIGN PATENT DOCUMENTS

JP 2003-139611 5/2003

* cited by examiner

*Primary Examiner*—Gregory J. Toatley, Jr.
*Assistant Examiner*—Marissa J. Detschel
(74) *Attorney, Agent, or Firm*—Westerman, Hattori, Daniels & Adrian, LLP.

(57) ABSTRACT

Disclosed herein is a spectrophotometer at least including: an optical waveguide; a light entrance slit provided at an end face on the inner side of the optical waveguide, for bringing an incident light into the optical waveguide; an optical element provided at an end face on the inner side of the optical waveguide or at an interior of the optical waveguide, for separating the incident light brought in the optical waveguide into a spectrum; and a photoelectric conversion device provided at an end face on the inner side of the optical waveguide, for detecting the incident light separated into the spectrum at the optical element; wherein the optical waveguide, the light entrance slit, and the optical element being integrally formed on an optical waveguide board, and a photoelectric conversion device substrate having the photoelectric conversion device formed thereon being mounted on the optical waveguide board.

9 Claims, 15 Drawing Sheets

FIG. 10D
FIG. 10C
FIG. 10A
FIG. 10B
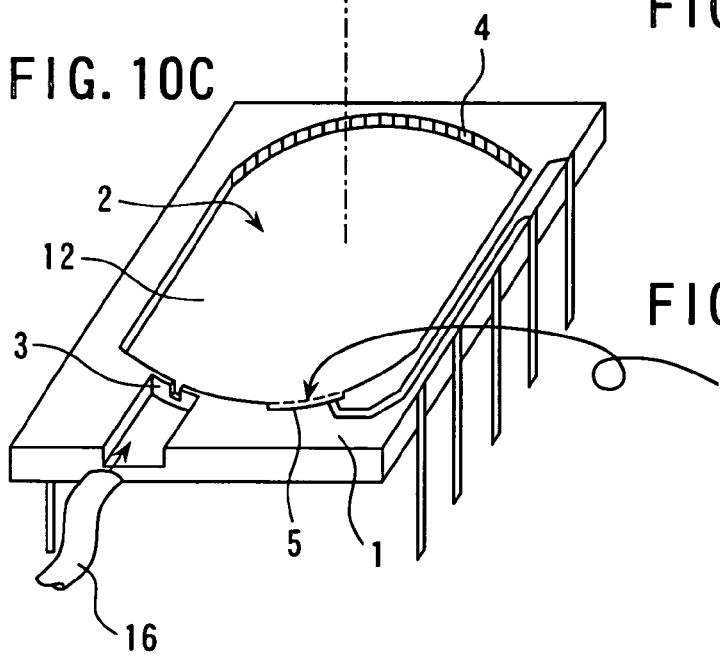
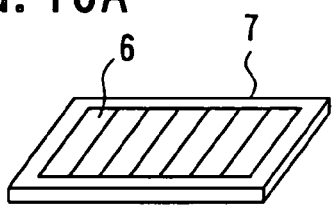
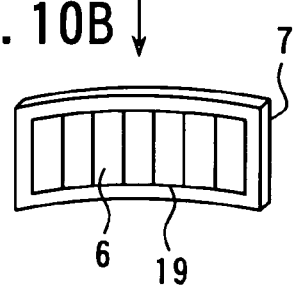

SPECTROPHOTOMETER

This application claims benefit of Japanese Patent Application No. 2003-98804 filed in Japan on Apr. 2, 2003, the contents of which are incorporated by this reference.

BACKGROUND OF THE INVENTION

The present invention relates to spectrophotometers, and more particularly relates to a small-size integrated spectrophotometer.

Spectrophotometers are used in many analyzing apparatus such as an analyzing apparatus for biochemistry. Those spectrophotometers combining optical component parts have the problems of how to rectify shift in the positioning alignment between the optical component parts to improve wavelength accuracy and how to reduce size thereof. As a solution to these problems, a technique concerning one-chip spectrophotometer has been proposed in Japanese patent application laid-open No. 2001-340309 by the present applicant.

Shown in FIG. 1 is a disassembled perspective view of the small-size spectrophotometer as proposed in the above Japanese patent application laid-open No. 2001-340309. FIG. 1 includes: 101, Si substrate; 102, an optical waveguide formed by etching of Si substrate 101; 103, a light entrance slit formed on an indented end surface on Si substrate 101 of the optical waveguide 102; 104, a diffraction grating serving as optical element formed on an end surface of the optical waveguide 102 facing the light entrance slit 103; and 105, a photodiode array serving as photoelectric conversion device formed on the end surface of the optical waveguide 102 toward which the light entrance slit 103 is formed such that a portion of Si substrate 101 be the light receiving portion thereof. Here, the light entrance slit 103, the center of the diffraction grating 104, and the light receiving surface of each individual photodiode of the photodiode array 105 is disposed along the Rowland circle.

Further, a reflecting film of metal such as Al or Au is coated on a bottom surface 106 of the optical waveguide 102 to form a reflecting surface. Also, a reflecting film of metal such as Al or Au is thinly coated on the surface of the diffraction grating 104. What is denoted by numeral 107 is a board for sealing the optical waveguide 102, coated with a reflecting film 108 of metal such as Al or Au on the surface thereof facing the optical waveguide. The board 107 is then closely abutted against the Si substrate 101 to seal the optical waveguide 102 so as to form a spectrophotometer.

In thus constructed spectrophotometer, light entered through the light entrance slit 103 is reflected on and separated into a spectrum at the diffraction grating 104 as indicated by arrows 109 and is incident on the photodiode array 105. The signals obtained from the photodiodes are subjected to signal processing by an externally provided amplifier, signal processing circuit, etc. It should be noted that the light is introduced into the light entrance slit 103 by an optical fiber 110.

With the spectrophotometer constructed as the above, the following advantages are obtained. First, the accuracy of measurement is improved, since the light entrance slit, diffraction grating serving as optical element, and each photodiode of the photoelectric conversion device are disposed along the Rowland circle. Further, it can be readily manufactured by using semiconductor technologies, and an integrated forming of the optical waveguide, light entrance slit, diffraction grating and photodiodes is possible. In short, it can be formed on a single chip so as to be reduced in size.

Furthermore, the efficiency in using light is improved, since the portion from the light entrance slit through the photoelectric conversion device is formed within the optical waveguide. Measurement without a loss of output from the photoelectric conversion device is then possible even when it is reduced in size. Moreover, the positioning adjustments for example between the optical components parts become unnecessary so that a reliable spectrophotometer can be achieved.

SUMMARY OF THE INVENTION

It is an object of the present invention to provide a spectrophotometer which provides high-level performance capable of stable measurement and at the same time is reliable and inexpensive, while maintaining its small size and accuracy of positioning between optical component parts. It is another object of the invention to provide a spectrophotometer having an optimum optical element substrate and optical element. It is yet another object of the invention to provide a spectrophotometer having an optimum photoelectric conversion device substrate and photoelectric conversion device. It is a further object of the invention to provide a spectrophotometer having an optimum optical waveguide board. It is another object of the invention to provide a spectrophotometer having an optimum connection means between the optical waveguide board and the photoelectric conversion device substrate. It is still another object of the invention to provide a spectrophotometer which is capable of efficiently using incident light.

In accordance with a first aspect of the invention, there is provided a spectrophotometer including: an optical waveguide; a light entrance slit provided at an end face on the inner side of the optical waveguide, for bringing incident light into the optical waveguide; an optical element provided at an end face on the inner side of the optical waveguide or at an interior of the optical waveguide, for separating the incident light brought in the optical waveguide into a spectrum; and a photoelectric conversion device provided at an end face on the inner side of the optical waveguide, for detecting the incident light separated into the spectrum at the optical element. The optical waveguide, the light entrance slit, and the optical element are integrally formed on an optical waveguide board, and the spectrophotometer is constructed such that a photoelectric conversion device substrate having the photoelectric conversion device formed thereon is mounted on the optical waveguide board.

In accordance with a second aspect of the invention, there is provided a spectrophotometer including: an optical waveguide; a light entrance slit provided at an end face on the inner side of the optical waveguide, for bringing incident light into the optical waveguide; an optical element provided at an end face on the inner side of the optical waveguide or at an interior of the optical waveguide, for separating the incident light brought in the optical waveguide into a spectrum; and a photoelectric conversion device provided at an end face on the inner side of the optical waveguide, for detecting the incident light separated into the spectrum at the optical element. The optical waveguide and the light entrance slit are integrally formed on an optical waveguide board, and the spectrophotometer is constructed such that an optical element substrate having the optical element formed thereon and a photoelectric conversion device substrate having the photoelectric conversion device formed thereon are mounted on the optical waveguide board.

In a third aspect of the invention, the optical element in the spectrophotometer according to the second aspect is formed on a surface of the optical element substrate etched into a curved configuration.

In a fourth aspect of the invention, the optical element in the spectrophotometer according to the second aspect is formed on a surface of a bendable optical element substrate and is mounted on the optical waveguide board with bending the optical element substrate.

In a fifth aspect of the invention, the optical element in the spectrophotometer according to the second aspect is formed on an optical element substrate having a region of the same height as the height of the optical waveguide, at a surface of the region of the same height.

In a sixth aspect of the invention, the photoelectric conversion device in the spectrophotometer according to any one of the first to fifth aspects is formed on a photoelectric conversion device substrate etched into a curved configuration.

In a seventh aspect of the invention, the photoelectric conversion device in the spectrophotometer according to any one of the first to fifth aspects is formed on a surface of a bendable photoelectric conversion device substrate and is mounted on the optical waveguide board with bending the photoelectric conversion device substrate.

In an eighth aspect of the invention, the photoelectric conversion device in the spectrophotometer according to any one of the first to fifth aspects is formed on a photoelectric conversion device substrate having a region of the same height as the height of the optical waveguide, at a surface of the region of the same height.

In a ninth aspect of the invention, the mounting portion for the photoelectric conversion device substrate of the optical waveguide board in the spectrophotometer according to any one of the first to fifth aspects has a light receiving slit.

BRIEF DESCRIPTION OF THE DRAWINGS

FIGS. 10A to 10D are a disassembled perspective view for illustrating a spectrophotometer according to a third embodiment of the invention.

DESCRIPTION OF THE PREFERRED EMBODIMENTS

First Embodiment

Figure 1:
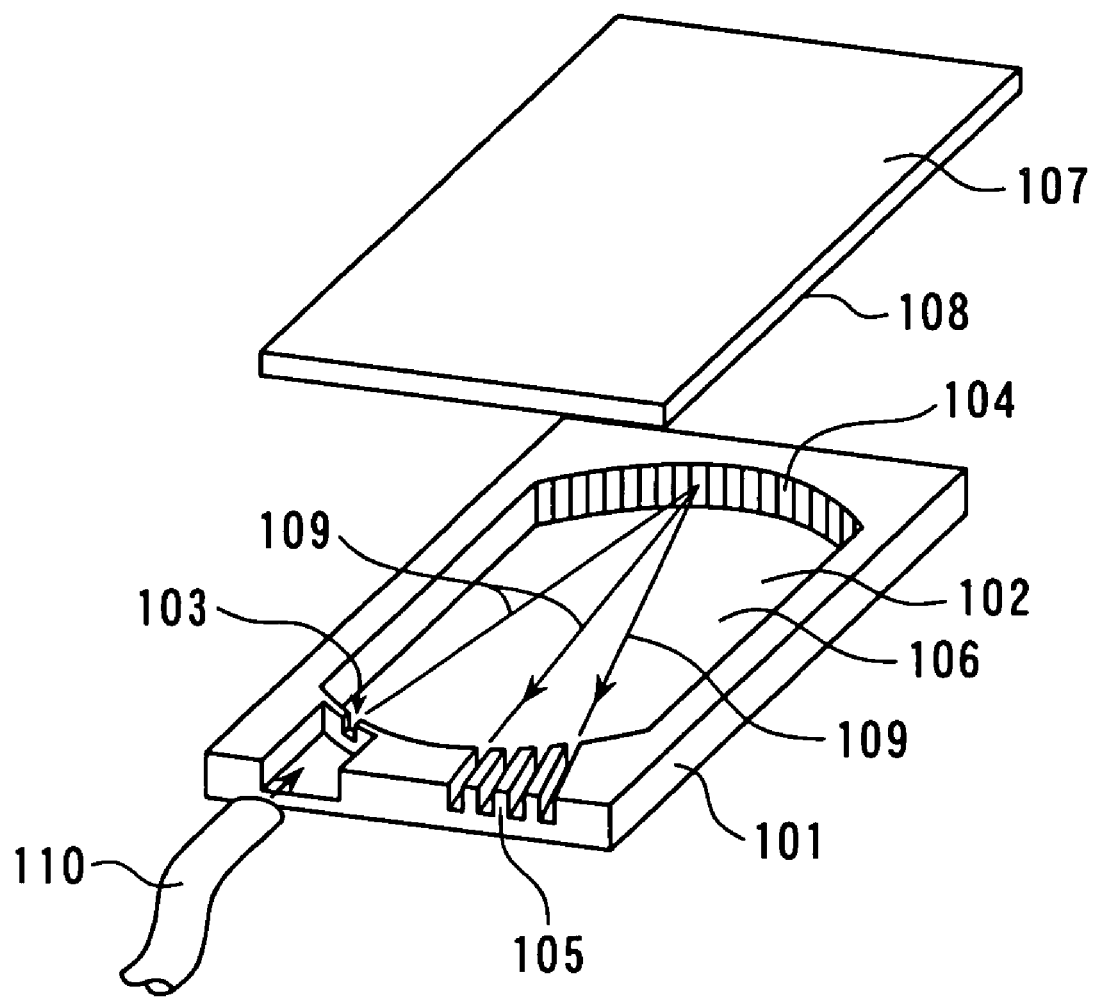
FIG. 1 is a disassembled perspective view for illustrating the conventional spectrophotometer.
Figure 2A:
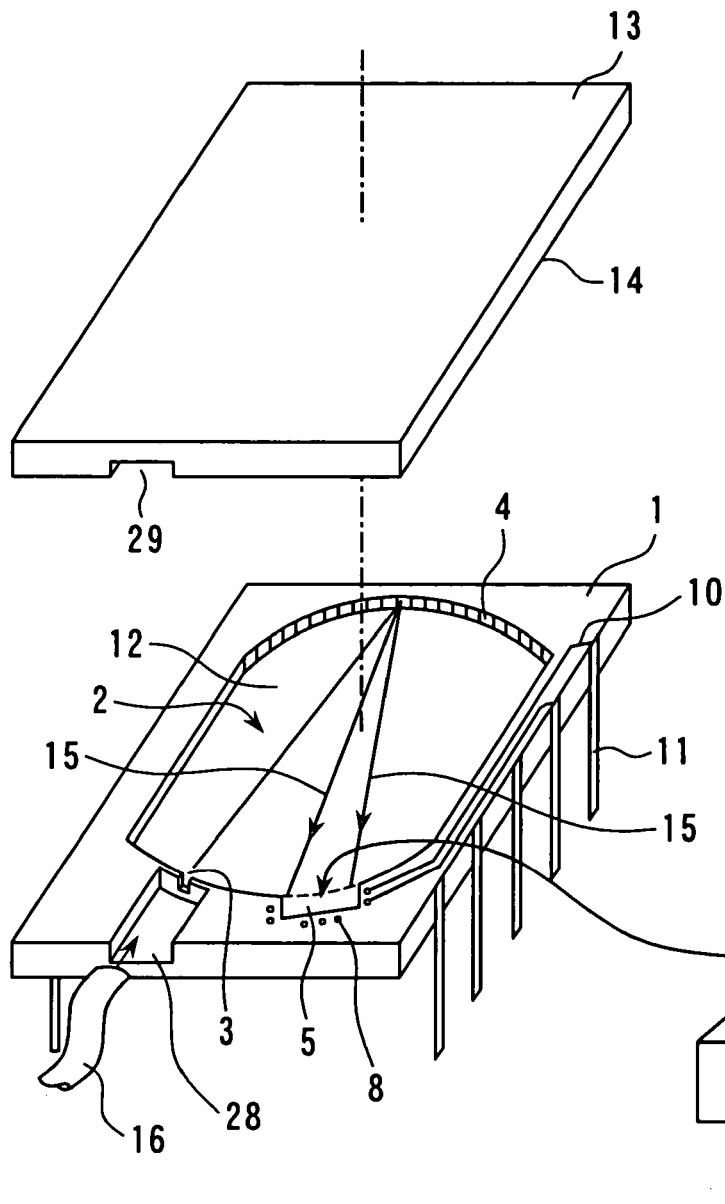
FIGS. 2A and 2B are a disassembled perspective view for illustrating a spectrophotometer according to a first embodiment of the invention.

Some embodiments of the spectrophotometer according to the invention will be described in the following. A first embodiment will now be described. FIG. 2A is a disassembled perspective view showing the first embodiment of the spectrophotometer according to the invention. Referring to FIG. 2A, what is denoted by numeral 1 is an optical waveguide board having thereon an optical waveguide 2 of which a portion is processed into a concave. A metal, ceramic, or plastic, for example, may be used as the material of the optical waveguide board 1. Though its material is not limited, a board made of plastic is used here. Denoted by numeral 3 is a light entrance slit formed on an end face of the optical waveguide 2, i.e., a stepped end face portion of the optical waveguide board 1; 4 is a diffraction grating serving as optical element formed on an end face portion of the optical waveguide 2 facing the light entrance slit 3; 5 is a mounting portion for photoelectric conversion device formed on the end face of the optical waveguide 2 toward which the light entrance slit 3 is formed. These are all integrally formed with the optical waveguide board 1.

Figure 2B:
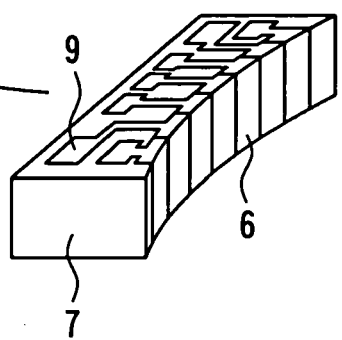

A photoelectric conversion device substrate 7 constructed separately from the optical waveguide board 1 and having a photodiode array 6 serving as photoelectric conversion device disposed thereon as shown in an enlarged manner in FIG. 2B is mounted on the photoelectric conversion device mounting portion 5 so that the light receiving surface of the photodiode array 6 faces the diffraction grating 4. The photoelectric conversion device substrate 7 may either be a semiconductor for example of Si, GaAs, or be an insulating board for example of a ceramic or glass fiber reinforced epoxy resin on which electronic component parts such as resistor and capacitor are mounted. In this example, an Si substrate is used. The photoelectric conversion device substrate 7 is etched into a curved configuration at its surface facing the diffraction grating 4 and has a light receiving surface on the etched surface. The photodiode array 6 is of a special structure where its light receiving surface is provided on the etched surface. It should be noted that, when an insulating board is used as the photoelectric conversion device substrate 7, a separately formed photodiode array 6 is disposed on the curved surface for example by means of pasting.

Denoted by numeral 8 is an electrode pad formed on the optical waveguide board 1, which is electrically connected through a metal wire (not shown) such as of Au or Al to an electrode pad 9 of the photodiode array 6 provided on the photoelectric conversion device substrate 7. Denoted by numeral 10 is an electrical wiring of metal such as Al provided on the optical waveguide board 1. The electrical wiring 10 is connected to a terminal 11 provided on a side surface of the optical waveguide board 1 so as to fetch photodiode signals received at the electrode pad 8 to the outside of the spectrophotometer. Here, the light entrance slit 3, the center of the diffraction grating 4, and the light receiving surface of the photodiode array 6 are formed so as to be located on a Rowland circle when the photoelectric conversion device substrate 7 is mounted on the optical waveguide board 1.

A bottom surface 12 of the optical waveguide 2 is coated with a reflecting film of metal such as Al or Au. Further, a surface of the diffraction grating 4 is thinly coated with a reflecting film of metal such as Al or Au. Numeral 13 shown in FIG. 2A denotes a cover board for sealing the optical waveguide 2. A surface thereof facing the optical waveguide is coated with a reflecting film 14 of metal such as Al or Au. The cover board 13 is closely abutted against the optical waveguide board 1 to seal the optical waveguide 2 so as to constitute a spectrophotometer.

In thus constructed spectrophotometer, an incident light entered through the light entrance slit 3 is reflected and separated into a spectrum at the diffraction grating 4 as indicated by arrowhead optical path 15 and is incident on the light receiving portion of the photodiode array 6. The signals obtained from the photodiodes are transmitted through the electrical wiring 10 and terminal 11 for example to an externally provided amplifier and signal processing circuit (not shown) and subjected to signal processing thereat. It should be noted that light is introduced into the light entrance slit 3 by means of an optical fiber 16. In order to place the optical fiber 16 closely to the light entrance slit 3, fiber inserting portions 28, 29 each processed into a concave are provided on the optical waveguide board 1 and the cover board 13, respectively.

Figure 3:
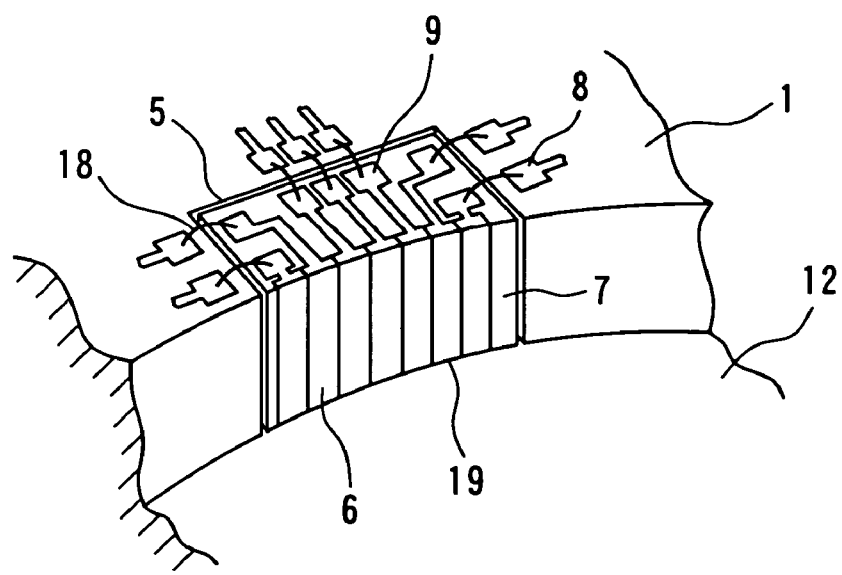
FIG. 3 is an enlarged view for illustrating the manner of electrical connection between the photoelectric conversion device substrate and the optical waveguide board of the spectrophotometer according to the first embodiment shown in FIGS. 2A and 2B.

A detailed description will now be given with respect to the manner of the photoelectric conversion device substrate 7 and to the electrical connection for fetching the electrical signals from the photodiode array 6 which is provided on the photoelectric conversion device substrate. FIG. 3 is an enlarged perspective view as seen from the incidence side of the manner of mounting the photoelectric conversion device substrate 7 having the photodiode array 6 disposed thereon on the optical waveguide board 1. The light receiving surface of the photodiode array 6 is formed on a surface portion of the photoelectric conversion device substrate 7 etched into a curved surface so that it is placed on a Rowland circle together with the light entrance slit 3 and the diffraction grating 4 when the photoelectric conversion device substrate 7 is mounted on the optical waveguide board 1. The photoelectric conversion device substrate 7 is fixed to the optical waveguide board 1 by the technique for example of soldering or adhesion. An electrical connection is provided between the electrode pad 8 of the optical waveguide board 1 and the electrode pad 9 of the photoelectric conversion device substrate 7 by means of metal wire 18 such as of Al or Au.

Figure 4:
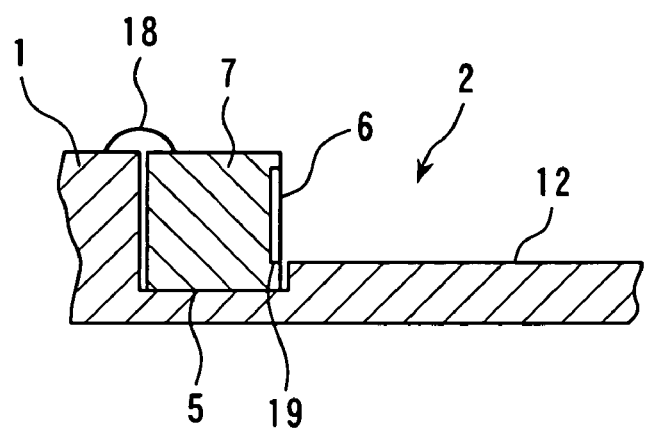
FIG. 4 is a sectional view illustrating the photoelectric conversion device substrate mounting portion of the optical waveguide board of the spectrophotometer according to the first embodiment shown in FIGS. 2A and 2B.

Here, since a light passage region is formed within the space between the bottom surface 12 of the optical waveguide 2 and the reflecting film 14 on the cover substrate 13, the efficiency in using the light propagated through the optical waveguide 2 becomes maximum if the photoelectric conversion device substrate 7 can be fixed to the optical waveguide board 1 so that the position of a lower end 19 of the light receiving surface of the photodiode array 6 reaches the bottom surface 12 of the optical waveguide 2. For this reason, as shown in FIG. 4, the bottom plane of the mounting portion 5 of the optical waveguide board 1 on which the photoelectric conversion device substrate 7 is to be mounted is preferably formed deeper than the bottom surface 12 of the optical waveguide 2 in processing the mounting portion 5 so that the position of the lower end 19 of the light receiving surface of the photodiode array 6 reaches the bottom surface 12 of the optical waveguide 2.

Figure 5:
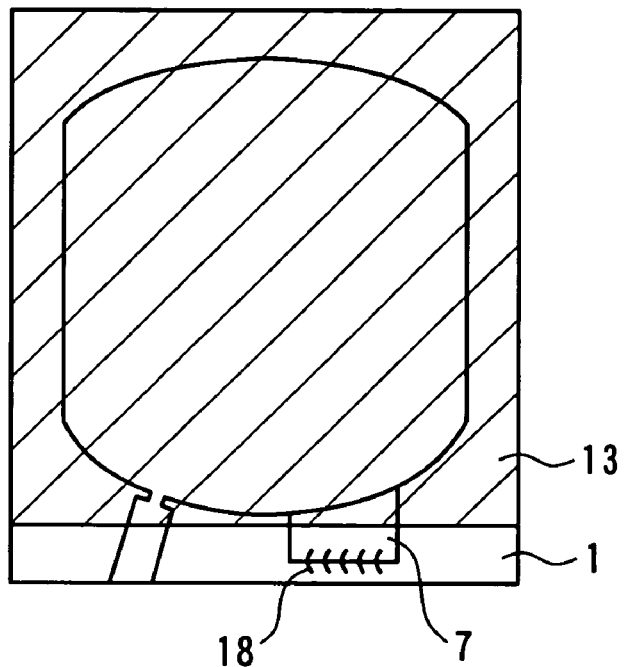
FIG. 5 is a perspective view as seen from top of the spectrophotometer according to the first embodiment shown in FIGS. 2A and 2B.
Figure 6:
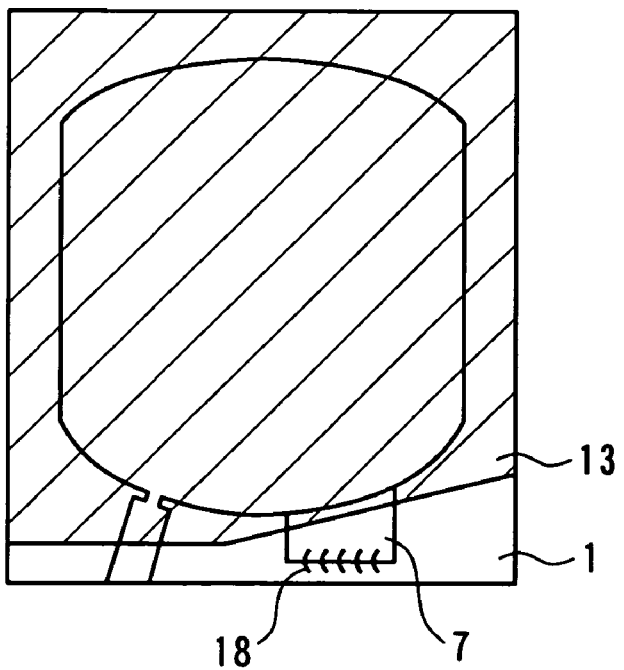
FIG. 6 is a perspective view as seen from top of a modification of the spectrophotometer according to the first embodiment shown in FIGS. 2A and 2B.
Figure 7:
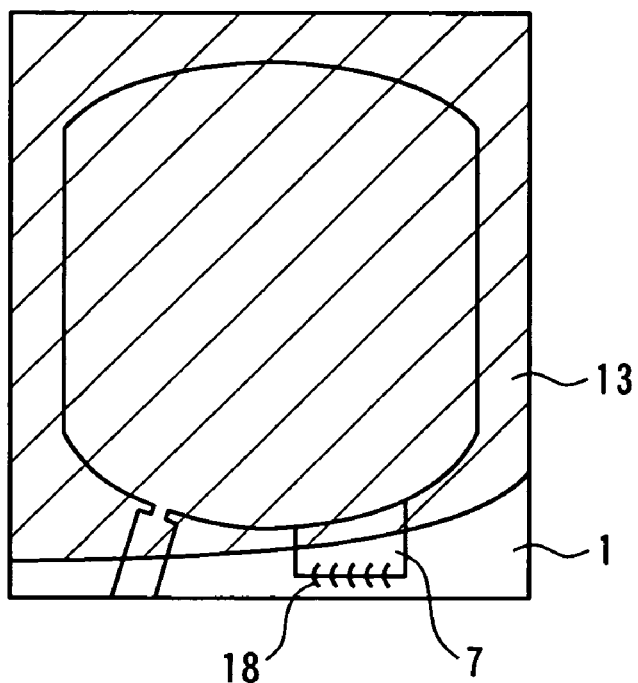
FIG. 7 is a perspective view as seen from top of another modification of the spectrophotometer according to the first embodiment shown in FIGS. 2A and 2B.
Figure 8:
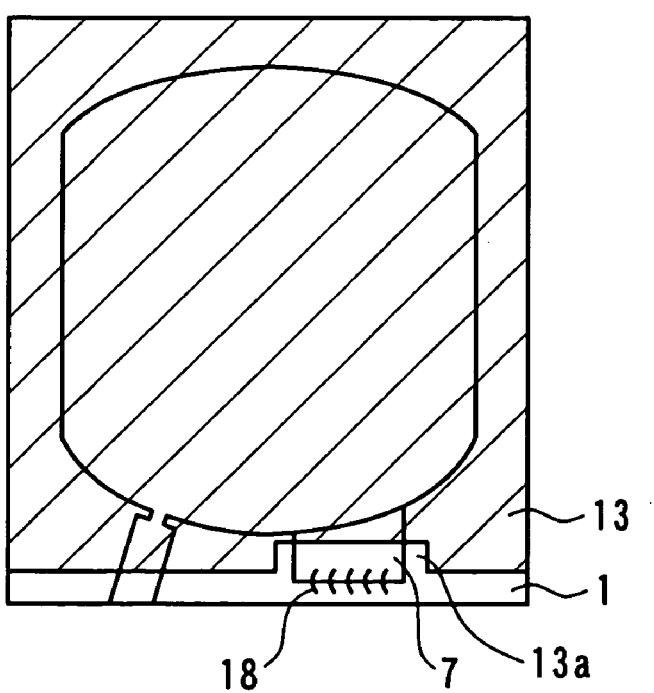
FIG. 8 is a perspective view as seen from top of yet another modification of the spectrophotometer according to the first embodiment shown in FIGS. 2A and 2B.

FIG. 5 is a perspective view as seen from top of the manner where the optical waveguide board 1 is sealed by the cover board 13. The cover board 13 is disposed and brought into close contact so that it covers the optical waveguide 2 and at the same time it does not contact the metal wire 18 for connecting between the electrode pad 9 of the photodiode array 6 and the electrode pad 8 of the optical waveguide board 1. Here, in order to more securely cover the optical waveguide 2 and avoid contact with the metal wire 18, the cover board 13 is preferably formed into a cover board configuration where the metal wire 18 is avoided, such as a polygon having five or more sides or a configuration combining curves as shown in FIG. 6 or FIG. 7. Alternatively, it is also possible to provide a notch 13a on the cover board 13 at a portion corresponding to the portion of metal wire disposition as shown in FIG. 8.

The electrical connection between the electrode pad 9 of the photodiode array 6 and the electrode pad 8 of the optical waveguide board 1 by the metal wire 18 shown here has already been established as a semiconductor electrical connection technology. It is a mounting technique that is technically easy and inexpensive and at the same time is reliable.

According to the construction as the above, the respective optical elements of the light entrance slit, diffraction grating and optical waveguide can be fabricated integrally on one board and at the same time by using an inexpensive material such as a plastic. Further, a minimum size required for its function suffices as that of the photodiode which is expensive as compared to an optical element. It is thereby possible to fabricate an inexpensive and downsized spectrophotometer while making it possible to dispose optical component parts at high positioning accuracy so as to maintain an equivalent function as the prior-art example.

Second Embodiment

Figure 9:
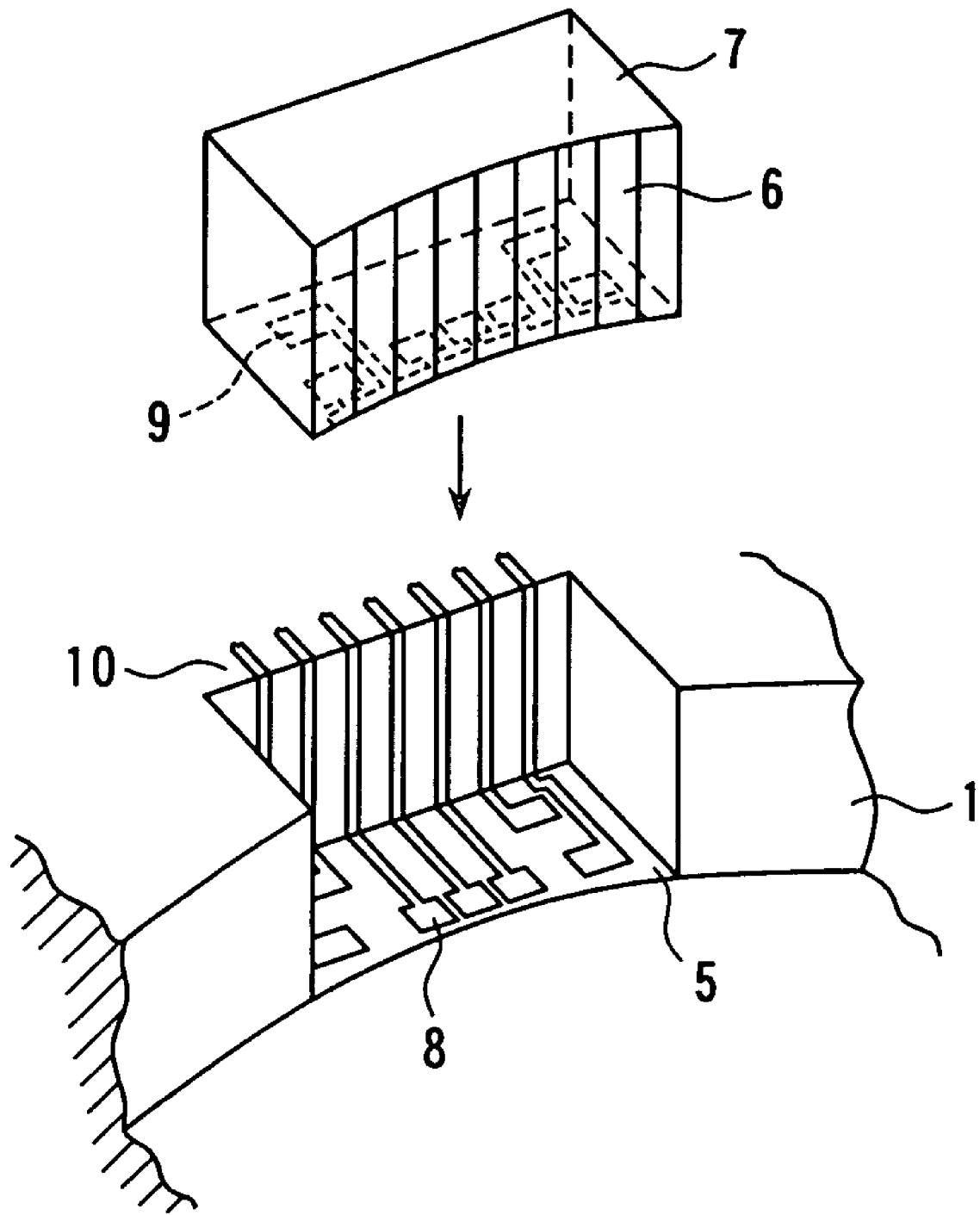
FIG. 9 is an enlarged, disassembled perspective view for illustrating the photoelectric conversion device substrate and the optical waveguide board in a spectrophotometer according to a second embodiment of the invention.

A second embodiment of the spectrophotometer according to the invention will now be described. In the present embodiment, the electrical connection means between the photoelectric conversion device substrate and the optical waveguide board is formed in another manner different from the above described first embodiment. FIG. 9 shows main portions of the second embodiment of the spectrophotometer according to the invention. In particular, FIG. 9 is a disassembled perspective view as seen from the incidence side of the manner of mounting on the optical waveguide board 1 the photoelectric conversion device substrate 7 on which the photodiode array 6 is disposed. Those components corresponding to those in the first embodiment shown in FIG. 3 are denoted by identical reference numerals.

As shown in FIG. 9, the electrode pad 8 of the optical waveguide board side is provided on the bottom portion of the photoelectric conversion device mounting portion 5 of the optical waveguide board 1, and an electrical wiring 10 is laid out from a surface of the optical waveguide board 1 through a side of the mounting portion 5 to the electrode pad 8. The photoelectric conversion device substrate 7 having the photodiode array 6 provided thereon is mounted so that the electrode pad 9 disposed on the bottom surface thereof is caused to face the electrode pad 8 within the photoelectric conversion device mounting portion 5 in the optical waveguide board 1. Such mounting construction is achieved by flip chip bonding or the connection technique using an anisotropic conductive resin. It should be noted that an insulating film is coated on the electrical wiring 10 except the electrode pad 8 thereof.

Here, although the photoelectric conversion device substrate 7 is preferably formed so as to result in the same height as that of the optical waveguide 2, it is not always necessary to form it to the same height. If the height of the photoelectric conversion device substrate 7 is lower, it is only required to be sealed with the cover board 13 without being subjected to a special processing. If, on the other hand, the height of the photoelectric conversion device substrate 7 becomes higher than the optical waveguide 2, a concave portion is provided on the cover board side corresponding to the mounting position of the photoelectric conversion device substrate 7 so that the photoelectric conversion device substrate 7 can be mounted.

With the electrical connection as described above between the electrode pad 9 of the photodiode array 6 and the electrode pad 8 on the optical waveguide board 1, the following advantage can be obtained. In particular, there is no possibility of a breaking of wire or short circuit unlike the case of connection using a metal wire where the metal wire lifted to a position higher than the surface of the optical waveguide board 1 is brought into contact with the cover board 13. Accordingly, the yield regarding the electrical connection can be improved.

Third Embodiment

A third embodiment according to the invention will now be described. In the present embodiment, the construction of the light receiving surface of the photodiode array is different from the first and second embodiments. As a result, the manner of electrical connection between the photoelectric conversion device substrate and the optical waveguide board is different. The construction of other portions is similar to that of the first embodiment. FIGS. 10A to 10D are a disassembled perspective view showing the third embodiment of the spectrophotometer according to the invention. Like components as in the first embodiment shown in FIGS. 2A and 2B are denoted by like reference numerals.

As shown in FIG. 10A, a photoelectric conversion device substrate 7 is prepared such that a plate-like photoelectric conversion device substrate portion having the photodiode array 6 and its receiving surface formed on a surface thereof is formed into a thin film for example by polishing or etching. The thin-film photoelectric conversion device substrate 7 is then fixed to and mounted on the mounting portion 5 of the optical waveguide board 1 in its bent manner and at the same time in its upright posture as shown in FIGS. 10B and 10C so that the light receiving surface thereof faces the direction of the incoming light. In such mounted condition, the light receiving surface of the photodiode array 6, the light entrance slit 3, and the center of the diffraction grating 4 are disposed on the Rowland circle. Here, the manner of curvature of the thin-film photoelectric conversion device substrate 7 and its positioning with respect to the optical waveguide board 1 can be achieved with a high reproducibility by forming the bottom surface of the mounting portion 5 of the optical waveguide board 1 for mounting the thin-film photoelectric conversion device substrate 7 to a depth deeper than the optical waveguide surface similarly to the first embodiment so that the position of the lower end 19 of the light receiving surface of the photodiode array 6 reaches the bottom surface 12 of the optical waveguide 2.

Figure 11:
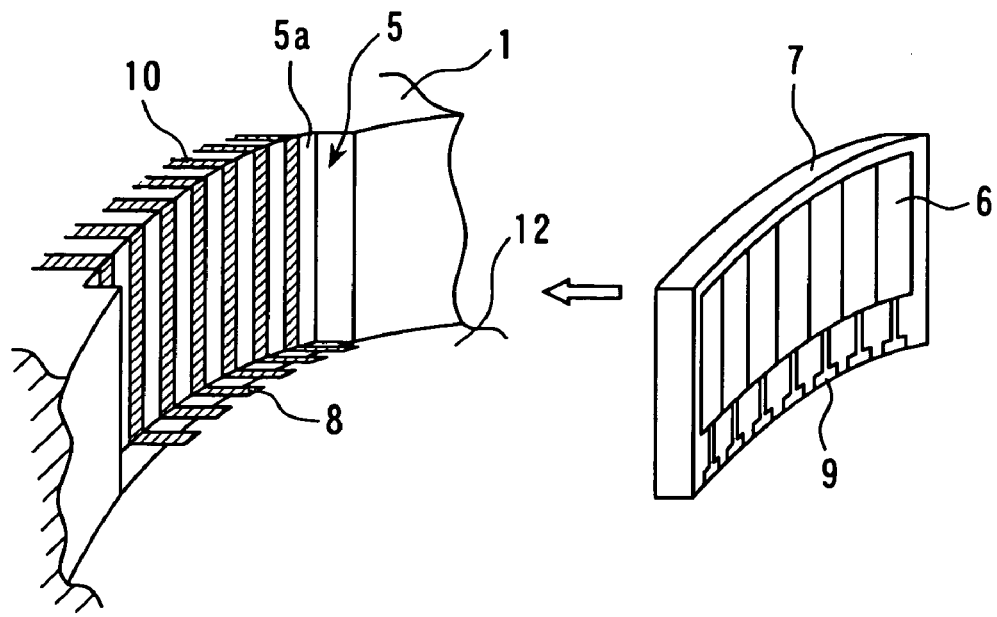
FIG. 11 is an enlarged, disassembled perspective view for illustrating the photoelectric conversion device substrate and the optical waveguide board in the spectrophotometer according to the third embodiment shown in FIGS. 10A to 10D.
Figure 12:
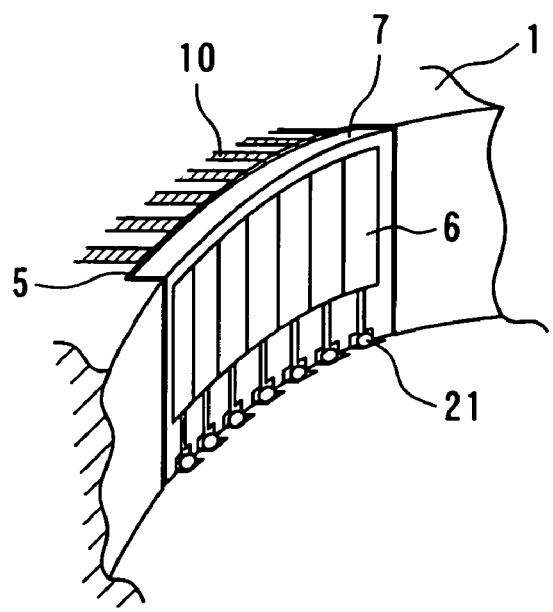
FIG. 12 is an enlarged perspective view for illustrating the photoelectric conversion device substrate mounting portion of the spectrophotometer according to the third embodiment shown in FIGS. 10A to 10D.

A description will now be given with respect to the method of electrical connection between the thin-film photoelectric conversion device substrate 7 and the optical waveguide board 1 in this embodiment. FIG. 11 is a disassembled perspective view as seen from the incidence side of the manner before the mounting onto the optical waveguide board 1 of the thin-film photoelectric conversion device substrate 7 on which the photodiode array 6 is disposed; and FIG. 12 is a perspective view showing the same in the mounted condition. Referring to FIG. 11, the electrical wiring 10 on the optical waveguide board 1 is extended to a bottom portion of the mounting portion 5 through a back wall portion 5a of the mounting portion 5. The electrode pad 8, which is a terminal end of the electrical wiring 10, is formed from the bottom surface of the mounting portion 5 so as to be extended beyond the boundary between the mounting portion 5 and the optical waveguide 2 and jut out into the optical waveguide 2. A light receiving surface and electrode pad 9 are provided on the surface of the bent thin-film photoelectric conversion device substrate 7, and the electrode pad 9 is disposed toward the lower end surface of the photoelectric conversion device substrate 7. After placing the thin-film photoelectric conversion device substrate 7 in its bent condition on the mounting portion 5 of the optical waveguide board 1, the mounting is effected as shown in FIG. 12 by electrically connecting the electrode pad 8 of the optical waveguide board 1 and the electrode pad 9 of the photoelectric conversion device substrate 7 to each other by means of a conductive adhesive or solder 21.

In the present embodiment, it is important to maintain the curvature of the light receiving surface of the thin-film photoelectric conversion device substrate 7. To this end, it is preferable to process the back wall portion 5a of the photoelectric conversion device mounting portion 5 into a curved surface and to fix the thin-film photoelectric conversion device substrate 7 in a manner abutted against the back wall portion 5a. It is naturally also possible, depending on the height of the thin-film photoelectric conversion device substrate 7, to provide a concave portion on the cover board 13 as previously described in the second embodiment so that the upper end portion of the photoelectric conversion device substrate 7 be held within the cover substrate.

According to this embodiment, the cost of the photoelectric conversion device substrate can be reduced, since, unlike the first and second embodiments, it is not necessary to use a special-construction photodiode where the light receiving surface is provided on a surface portion etched into a curvature.

Fourth Embodiment

Figure 13:
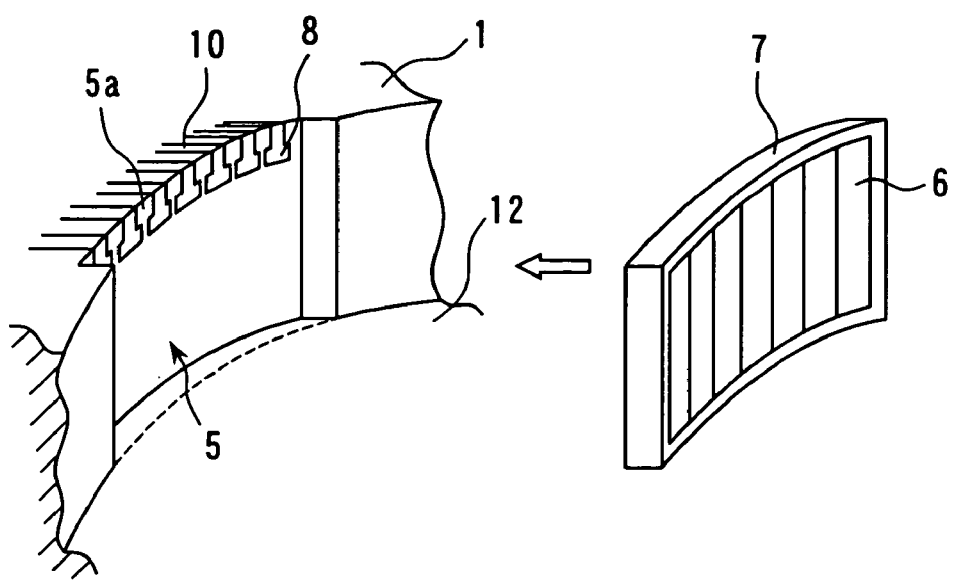
FIG. 13 is an enlarged, disassembled perspective view for illustrating the photoelectric conversion device substrate and the optical waveguide board in a spectrophotometer according to a fourth embodiment of the invention.

A fourth embodiment according to the invention will now be described. The present embodiment is related to yet another electrical connection method between the photoelectric conversion device substrate and the optical waveguide board. FIG. 13 shows main portions of the fourth embodiment of the spectrophotometer according to the invention and is a disassembled perspective view as seen from the incidence side of the manner of mounting onto the optical waveguide board 1 the photoelectric conversion device substrate 7 on which the photodiode array 6 is disposed.

Referring to FIG. 13, an electrode pad 8 of the optical waveguide board side is provided on a processed back wall portion 5a within the photoelectric conversion device mounting portion 5 of the optical waveguide board 1, and the electrical wiring 10 is extended to the electrode pad 8. The electrode pad (not shown) of the photoelectric conversion device is provided on the reverse side of the photoelectric conversion device substrate 7. The reverse side electrode pad on the photoelectric conversion device substrate 7 and the electrode pad 8 on the optical waveguide board 1 are then caused to face each other so as to provide an electrical connection thereof. For such electrical connection, flip chip, conductive resin or the like is used.

Further, the connection between the reverse side electrode pad of the photoelectric conversion device substrate 7 and the photodiode array 6 can either be effected through the diffusion layer in the substrate or be achieved by using a penetrating electrode or side surface wiring of the substrate. It should be noted that the electrical connection method according to the present embodiment can naturally also be applied to photoelectric conversion device substrates of any configuration such as the photoelectric conversion device substrate shown in the first to third embodiments irrespective of the configuration of the photoelectric conversion device substrate.

In this embodiment, since it is not necessary to provide an electrode pad on a surface of the light receiving side of the photodiode array of the photoelectric conversion device substrate, a larger light receiving area can be provided on the surface of the light receiving side. Accordingly, a greater signal output can be fetched as compared to the first to third embodiments so as to make a stable spectrophotometric measurement possible.

Fifth Embodiment

Figure 14A:
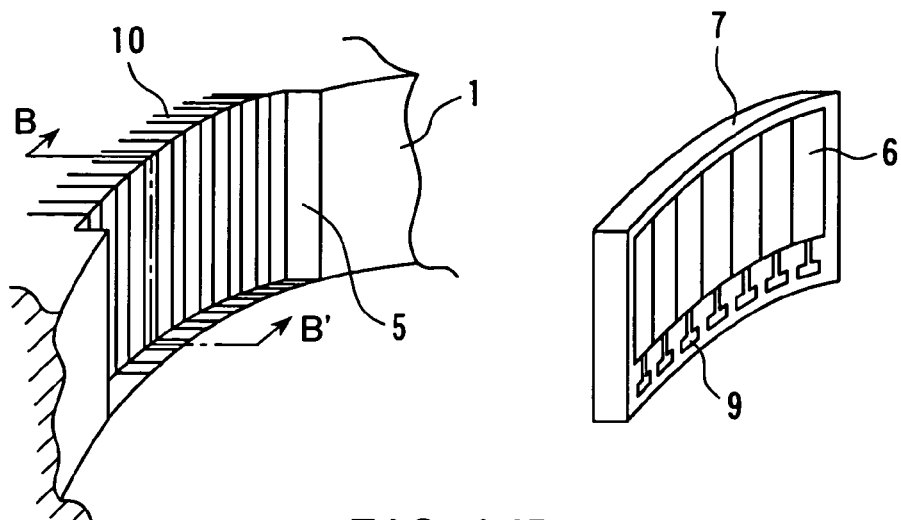
FIGS. 14A and 14B are an enlarged disassembled perspective view and an enlarged sectional view, respectively, for illustrating the photoelectric conversion device substrate and the optical waveguide board in a spectrophotometer according to a fifth embodiment of the invention.
Figure 14B:
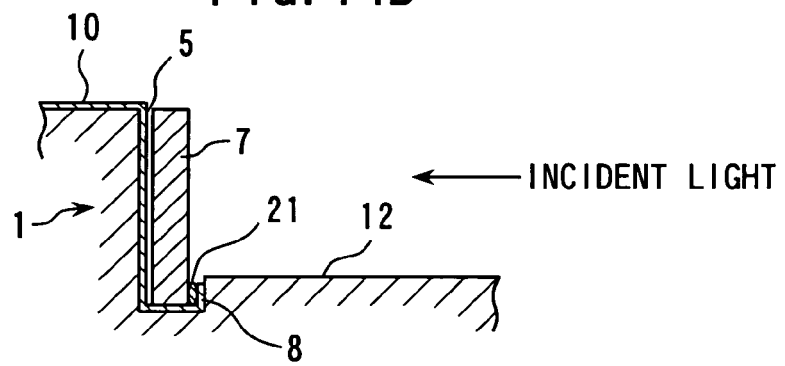

A fifth embodiment of the spectrophotometer according to the invention will now be described. The present embodiment is related to still another electrical connection method between the photoelectric conversion device substrate and the optical waveguide board. FIGS. 14A and 14B show main portions of the fifth embodiment of the spectrophotometer according to the invention. FIG. 14A is a disassemble perspective as seen from the incidence side of the manner before the mounting onto the optical waveguide board 1 of the photoelectric conversion device substrate 7 on which the photodiode array 6 is mounted; and FIG. 14B is a sectional view along line B–B' of FIG. 14A showing the photoelectric conversion device substrate 7 in its mounted position.

As shown in FIGS. 14A and 14B, the bottom surface of the mounting portion 5 for the photoelectric conversion device substrate 7 is dug deeper than the optical waveguide bottom surface 12 of the optical waveguide board 1, and an electrode pad 8 on the optical waveguide board is provided on the side toward the optical waveguide 2 of the deeper-dug portion. A metal wiring 10 is extended from a surface of the optical waveguide board 1 through the side wall and bottom surface of the mounting portion 5 to the electrode pad 8. An electrode pad 9 is provided at a lower portion of the light receiving surface of the photoelectric conversion device substrate 7. The electrode pad 9 on the photoelectric conversion device substrate disposed at the deeper-dug mounting portion 5 and the electrode pad 8 on the optical waveguide board are then caused to face each other to provide an electrical connection thereof. For such electrical connection, flip chip, conductive resin 21 or the like is used. It should be noted that the electrical connection method of the present embodiment can naturally also be applied to photoelectric conversion device substrates of any configuration such as the photoelectric conversion device substrate shown in the first to third embodiments irrespective of the configuration of the photoelectric conversion device substrate.

In this embodiment, although an electrode pad is provided on the light receiving surface side of the photodiode of the photoelectric conversion device substrate, the electrode pad is not exposed to the optical waveguide 2. For this reason, it is possible to provide a larger light receiving area exposed to the optical waveguide 2 so that it becomes possible to fetch larger signal currents.

Sixth Embodiment

Figure 15:
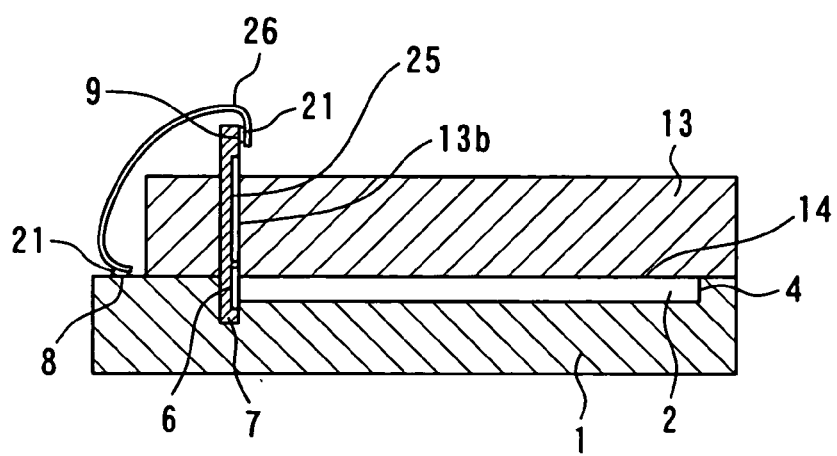
FIG. 15 is a sectional view for illustrating a spectrophotometer according to a sixth embodiment of the invention.

A sixth embodiment of the spectrophotometer according to the invention will now be described. The present embodiment is related to the packaging in the case where the size of the photoelectric conversion device substrate is extremely large. FIG. 15 is a sectional view showing the construction of the portion of the cover board, optical waveguide board, and photoelectric conversion device substrate in the present embodiment.

As shown in FIG. 15, a signal processing circuit 25 for photodiode signals, in addition to the photodiode array 6, is mounted on the photoelectric conversion device substrate 7 in this embodiment. A through hole 13b is formed on the cover board 13, and the photoelectric conversion device substrate 7 is inserted into the through hole 13b so that an electrode pad 9 thereof is exposed to the outside of the cover board 13. The photodiode array 6 on the photoelectric conversion device substrate 7 is disposed so as to face the optical waveguide 2, and a major portion of the signal processing circuit 25, on the other hand, is disposed within the through hole 13b. This is to prevent an erroneous operation due to light of the signal processing circuit 25.

The electrode pad 9 of the photoelectric conversion device substrate 7 is connected to one end of a flexible wiring member 26 by means of a conductive adhesive or solder 21, and the other end of the flexible wiring member 26 is connected to an electrode pad 8 on the optical waveguide board 1 by means of a conductive substrate or solder 21. While a flexible board for example of polyimide sheet is used as the flexible wiring member 26, a metal wire such as of Al or Au may also be used. If a metal wire is used, however, the conductive adhesive or solder 21 is not necessary. Further, the flexible wiring member 26 connected at one end thereof to the electrode pad 9 on the photoelectric conversion device substrate 7 is not necessarily required to be electrically connected to the optical waveguide board 1. It may be electrically connected to an external electrical member or package of the spectrophotometer.

In this embodiment, since a photoelectric conversion device substrate having greater size can be mounted, a photoelectric conversion device substrate having a large-scale line sensor as the photoelectric conversion device or a photoelectric conversion device substrate also having a signal processing function such as of A/D conversion, for example, can be mounted to improve the function of the spectrophotometer. Further, amplification and operation of received signals also become possible and a convenient and high-level spectrophotometer can be achieved by forming a signal processing circuit on the photoelectric conversion device substrate by CMOS device.

Seventh Embodiment

Figure 16:
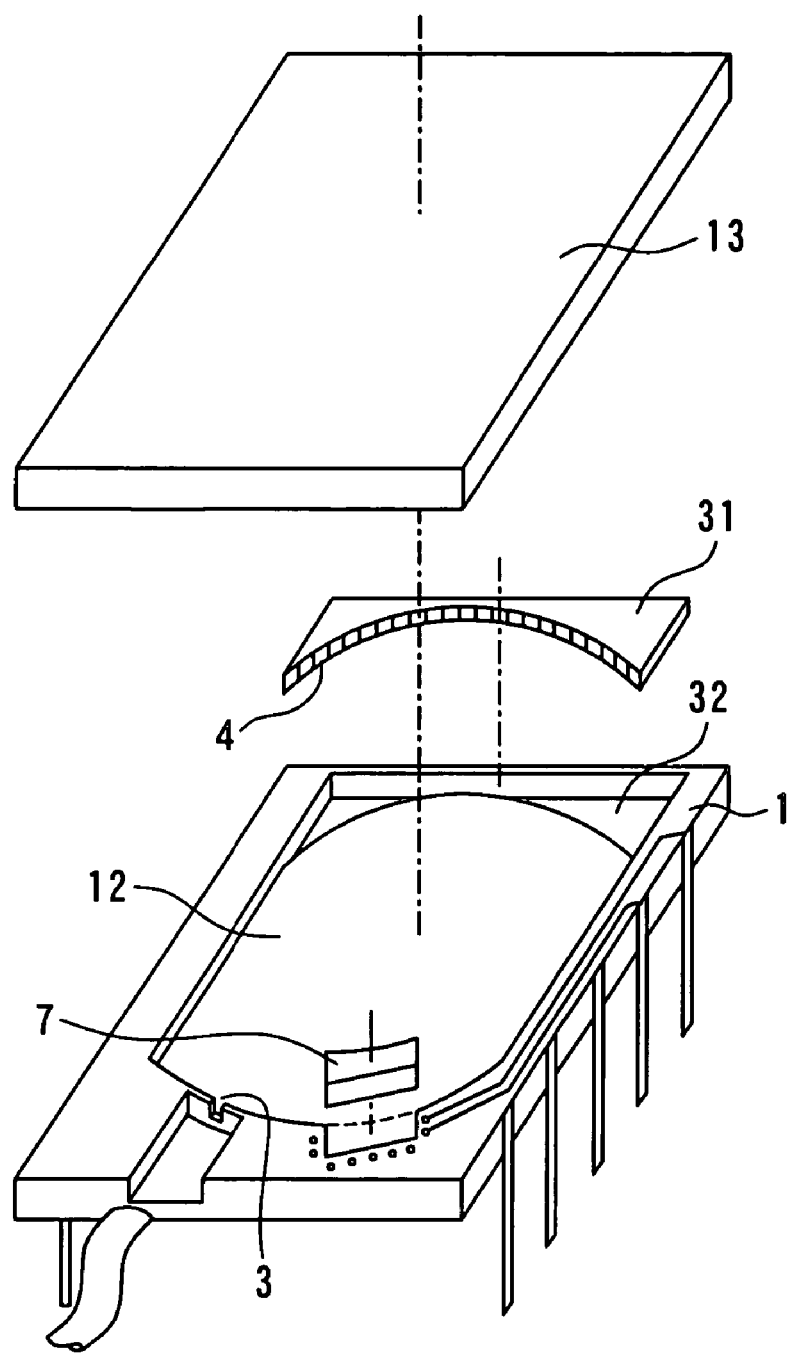
FIG. 16 is a disassembled perspective view for illustrating a spectrophotometer according to a seventh embodiment of the invention.

A seventh embodiment according to the invention will now be described. In the present embodiment, not only the photoelectric conversion device but also the optical element is fabricated on a separate substrate and is mounted on the optical waveguide board. FIG. 16 is a disassembled perspective view showing the seventh embodiment of the spectrophotometer according to the invention.

Referring to FIG. 16, what is denoted by numeral 31 is a standalone optical element substrate having a diffraction grating 4 disposed thereon. A blaze is etched with precision on a curved side surface of a flat base material such as of a resin, metal or ceramic having the side surface etched into a curved configuration, and the surface thereof is coated with a reflecting material such as Al or Au to form the diffraction grating 4. The standalone optical element substrate 31 and the photoelectric conversion device substrate 7 are mounted on the optical waveguide board 1 to construct the spectrophotometer. Here, the light receiving surface of the photodiode array 6 of the photoelectric conversion device substrate 7, the light entrance slit 3, and the center of the diffraction grating 4 are disposed on the Rowland circle. It should be noted that numeral 32 in the figure denotes a mounting portion for the optical element substrate 31 provided on the optical waveguide board 1. It is dug to a depth deeper than the bottom surface 12 of the optical waveguide 2 so as to make it easier to position the optical element substrate 31. The construction of the optical waveguide board 1 and the photoelectric conversion device substrate 7 is similar to other embodiments and description thereof will be omitted.

Here, shift in the mounting position between the optical waveguide board 1 and the optical element substrate 31 and shift in the mounting position between the optical waveguide board 1 and the photoelectric conversion device substrate 7, in some cases, may affect the measurement wavelength precision of the spectrophotometer. The influence of the mounting positioning shift on the wavelength resolution can be lessened by using one with smaller blaze pitch as the diffraction grating 4, since dispersion of the diffraction grating becomes greater. Further, since a greater number of kinds of processing methods can be applied to the diffraction grating to be fabricated alone as the optical element substrate 31 as compared to the case of forming it integrally with the optical waveguide board 1, it becomes possible to fabricate one having a favorable fabricating precision and thus smaller blaze pitch.

According to such construction, costs can be reduced by fabricating each of the diffraction grating and the photoelectric conversion device as a standalone member, and its performance can be maintained by using a diffraction grating having greater dispersion.

Eighth Embodiment

Figure 17A:
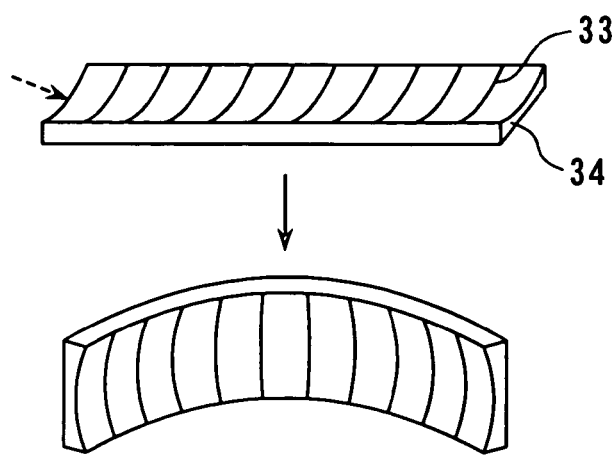
FIGS. 17A and 17B each are a perspective view for illustrating the optical element substrate in a spectrophotometer according to an eighth embodiment of the invention.
Figure 17B:
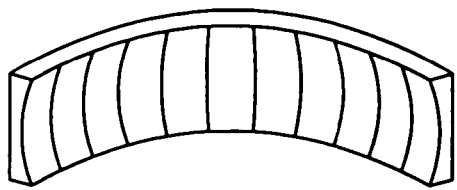

An eighth embodiment of the spectrophotometer according to the invention will now be described. The present embodiment is to provide an optical element substrate having another configuration. FIGS. 17A and 17B show the construction of an optical element substrate in the eighth embodiment of the spectrophotometer according to the invention.

Referring to FIG. 17A, denoted by numeral 33 are blazes formed in the manner of sawteeth on a surface of a flat plate-like optical element substrate 34. Photolithography and etching for example are used as the patterning method of the blazes 33. The optical element substrate 34 is mounted on the optical waveguide board 1 in its bent manner as shown in FIG. 17B. By providing as shown in FIG. 17A a concave lens-like curvature on the optical element substrate 34 as indicated by a dotted arrow in the figure, it is possible to provide the diffraction grating consisting of blazes 33 with a concave-surface light collecting effect. The light rays propagating through the optical waveguide can thereby be made parallel to each other when the optical element substrate 34 having such diffraction grating is mounted on the optical waveguide board 1. It becomes possible to mitigate a loss in the amount of light within the optical waveguide due to multiple reflections on the optical waveguide wall surface.

According to this embodiment, since the technology for forming blaze on a surface of flat plate-like substrate provides a better processing precision than the technology for forming blaze on a curved configuration side portion of a substrate, it becomes possible to obtain an optical element substrate having a diffraction grating consisting of more sharply processed blazes as compared to the diffraction grating of the seventh embodiment having blazes along a curved configuration side surface of an optical element substrate. The diffraction efficiency thereof is thereby improved and it becomes possible to fetch a greater output of the spectrophotometer.

Ninth Embodiment

Figure 18:
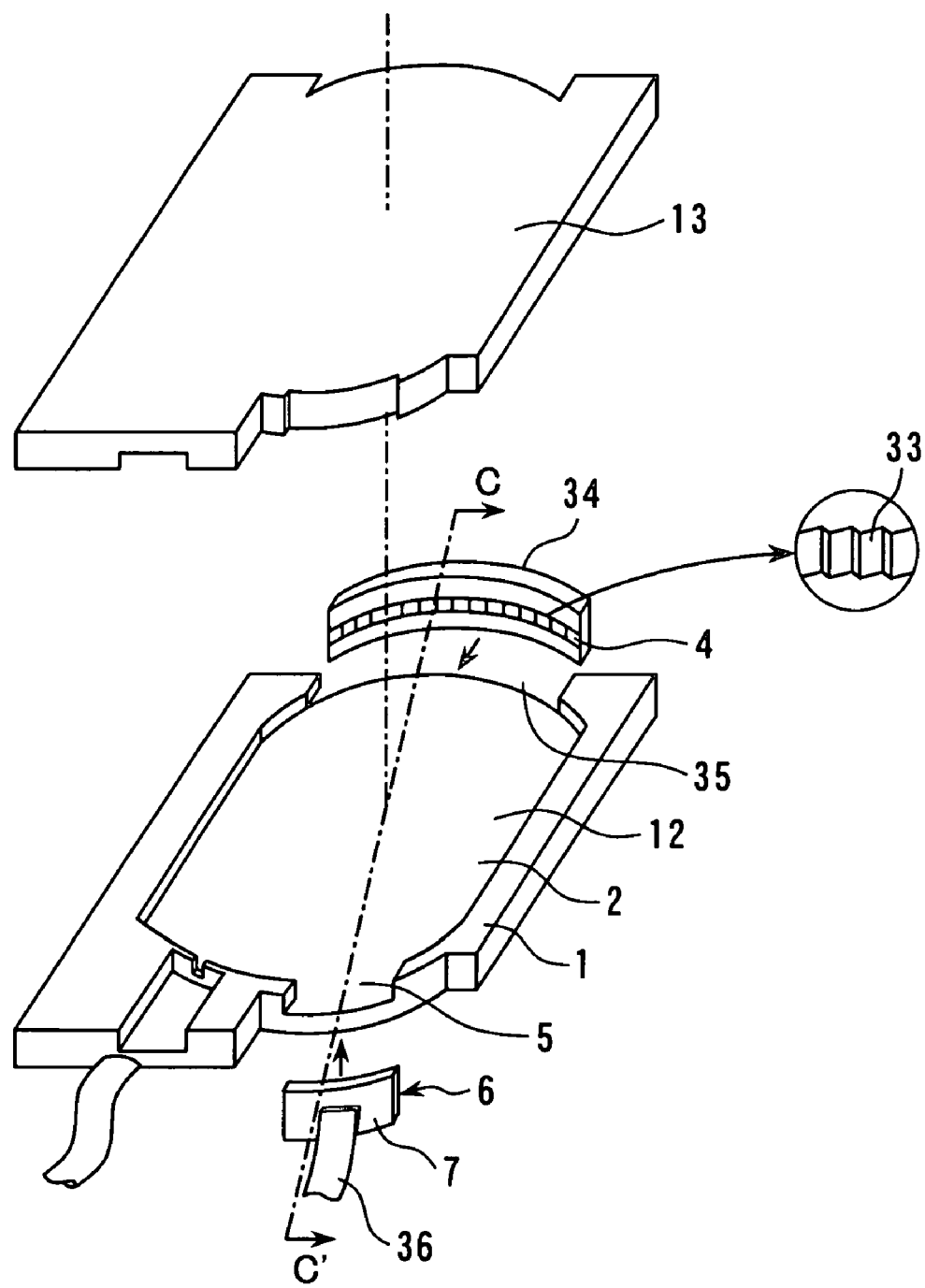
FIG. 18 is a disassembled perspective view for illustrating the spectrophotometer according to a ninth embodiment of the invention.

A ninth embodiment of the spectrophotometer according to the invention will now be described. The present embodiment is related to a spectrophotometer having an optical waveguide board of another configuration. FIG. 18 is a disassembled perspective view showing the ninth embodiment of the spectrophotometer according to the invention.

Of the optical waveguide board 1 in FIG. 18, a diffraction grating disposing region 35 and a mounting portion 5 for the photoelectric conversion device substrate 7 are formed by cutting the side wall of the optical waveguide board 1 to the same height as the bottom surface 12 of the optical waveguide 2. An optical element substrate 34 having a diffraction grating 4 disposed thereon is mounted on the above described cut diffraction grating disposing region 35 in a manner pasted from an outer side of the optical waveguide board 1. The diffraction grating is fabricated by engraving a blaze 33 on a portion of the optical element substrate 34 so that, when mounted on the optical waveguide board 1, the position of the diffraction grating 4 matches the position of the optical waveguide. The photoelectric conversion device substrate 7 is similarly mounted on the cut photoelectric conversion device substrate mounting portion 5 in a manner pasted from an outer side of the optical waveguide board 1. At this time, the light receiving surface of the photoelectric conversion device of the photoelectric conversion device substrate 7 corresponds to the position of the optical waveguide 2. The photoelectric conversion device substrate 7 is electrically connected at the reverse side thereof to a flexible wiring member 36. Here, the light receiving surface of the photoelectric conversion device, the light entrance slit, and the center of the diffraction grating are disposed on the Rowland circle. It should be noted that the cover board 13 is also notched at a portion thereof corresponding to the mounting configuration of the optical element substrate 34 and the photoelectric conversion device substrate 7 which are mounted on the optical waveguide board 1 in a manner pasted to the outer sides thereof.

Figure 19:
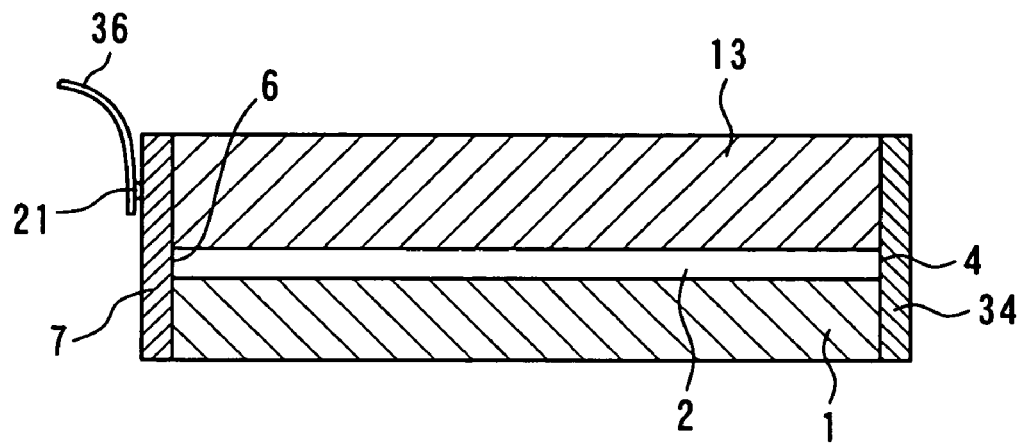
FIG. 19 is a sectional view showing the spectrophotometer according to the ninth embodiment shown in FIG. 18.

FIG. 19 shows a sectional view along line C–C' of the spectrophotometer shown in FIG. 18 in its assembled condition. The optical waveguide board 1, cover board 13, optical element substrate 34, and photoelectric conversion device substrate 7 are assembled in a manner closely abutted against each other. In this manner, a simple fabrication is possible by pasting the two boards and the optical element substrate 34 and photoelectric conversion device substrate 7 to each other. There is, however, concern over light leakage from the pasted portion thereof. It is an effective solution for this problem to process the regions facing the optical waveguide 2 into a convex, respectively, of the optical element substrate 34 and the photoelectric conversion device substrate 7. Such a manner is shown in the sectional view of FIG. 20.

Figure 20:
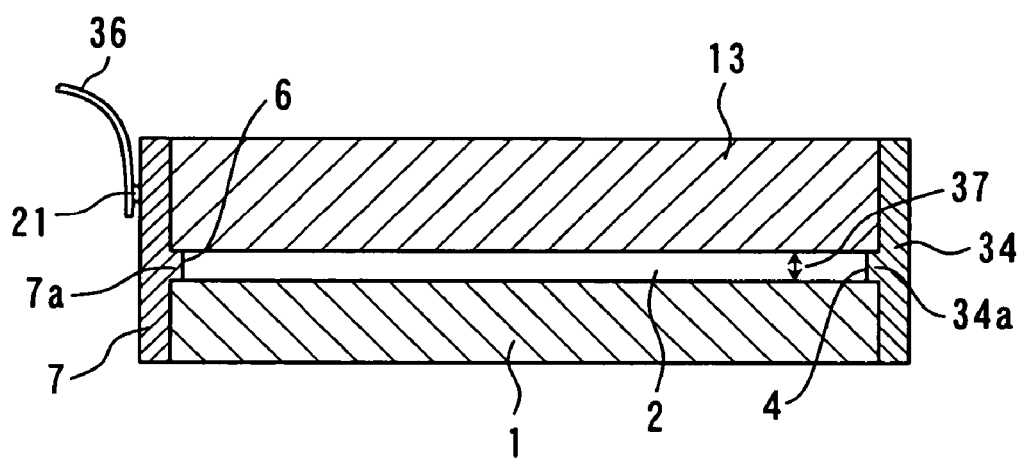
FIG. 20 is a sectional view showing a modification of the spectrophotometer according to the ninth embodiment shown in FIGS. 18 and 19.

Referring to FIG. 20, a region 34a processed into a convex corresponding to the height (indicated by arrows 37) of the optical waveguide 2 is provided on the optical element substrate 34, and the diffraction grating 4 is formed on a surface thereof. Further, a region 7a processed into a convex corresponding to the height of the optical waveguide 2 is provided also on the photoelectric conversion device substrate 7, and photodiode array 6 is disposed on a surface thereof. The diffraction grating 4, the light receiving portion of the photodiode array 6, and the light entrance slit 3 are disposed on the Rowland circle.

In thus constructed spectrophotometer, since the respective convex regions 34a, 7a of the optical element substrate 34 and the photoelectric conversion device substrate 7 are meshed with the optical waveguide board 1 and the cover board 13, there is an advantage that light leakage into the optical waveguide 2 from the outside is prevented.

According to the present embodiment, an inexpensive spectrophotometer can be fabricated, since it can be fabricated simply by pasting the four members to each other as has been described.

Tenth Embodiment

Figure 21:
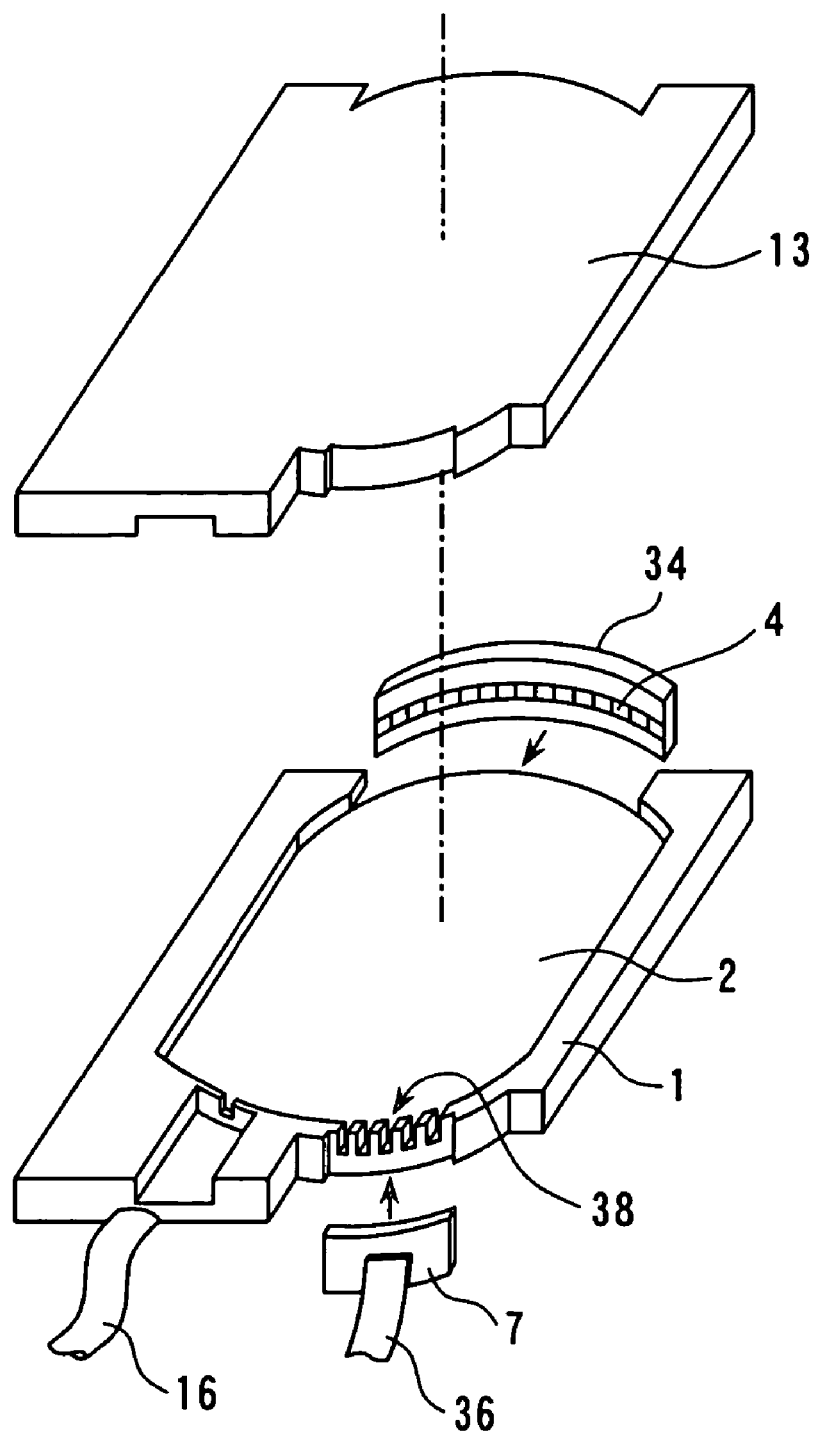
FIG. 21 is a disassembled perspective view for illustrating a spectrophotometer according to a tenth embodiment of the invention.

A tenth embodiment according to the invention will now be described. FIG. 21 is a disassembled perspective view showing the tenth embodiment of the spectrophotometer according to the invention.

In this embodiment, as shown in FIG. 21, light receiving slits 38 are provided at a portion where the photoelectric conversion device substrate 7 is pasted to the optical waveguide board 1. The light receiving slits 38 are opened at light collecting position of desired wavelengths. The photoelectric conversion device substrate 7 is pasted on a side of the optical waveguide board 1 so as to be closely abutted against the light receiving slits 38. The opening width of the light receiving slits 38 is formed to be narrower than the width of the light receiving portion of each photodiode so that the center wavelength received at the light receiving portion is unchanged even when a shift occurs in the pasting of the photoelectric conversion device substrate 7 that is within the difference between such opening width and the width of the light receiving portion.

According to the present embodiment, it is possible to fabricate a spectrophotometer where the center wavelength received at the light receiving portion is not deteriorated even if a positioning shift occurs of the photoelectric conversion device substrate.

The invention includes but not limited to the above described embodiments where a photodiode array is used as the photoelectric conversion device and a diffraction grating as the optical element. It is naturally also possible to use a line sensor as the photoelectric conversion device and a prism as the optical element. For example, a line sensor mounting a scanning circuit can be used as the photoelectric conversion device to obtain a greater number of wavelength signals by a smaller number of terminals. Further, if a prism is to be used as the optical element in the first to seventh embodiments, it can be provided within the optical waveguide instead of providing it on an internal end surface of the optical waveguide. Furthermore, an optical lens may be provided within the optical waveguide or between the light entrance slit and the optical fiber inserting portion. In this case, a loss in the amount of light in the optical waveguide can be reduced. Moreover, while description has been given with respect to those which are made capable of fetching electrical signals from the optical conversion device substrate by providing an electrode pad, electrical wiring and terminal on the optical waveguide board, it is also possible to fetch signals from the cover board by providing an electrode pad, electrical wiring and terminal on the cover board.

As has been described by way of the above embodiments, it is possible according to the first and second aspects of the invention to achieve a small-size spectrophotometer which is reliable and inexpensive at the same time of providing high-level performance and being capable of stable measurement. According to the third to fifth aspects of the invention, construction and configuration of a substrate having an optical element mounted thereon can be optimized in accordance with the optical element characteristic thereof. According to the sixth to eighth aspects of the invention, construction and configuration of a substrate having a photoelectric conversion device mounted thereon can be optimized in accordance with the characteristic of the photoelectric conversion device. According to the ninth aspect of the invention, a high-level spectrophotometer can be achieved, since light having propagated thorough the optical waveguide can be maximally used.

What is claimed is:

1. A spectrophotometer comprising:
   an optical waveguide;
   a light entrance slit provided at an end face on the inner side of the optical waveguide, for bringing an incident light into the optical waveguide;

an optical element provided at an end face on the inner side of said optical waveguide or at an interior of said optical waveguide, for separating the incident light brought in the optical waveguide into a spectrum; and a photoelectric conversion device provided at an end face on the inner side of said optical waveguide, for detecting the incident light separated into the spectrum at said optical element;

wherein said optical waveguide, said light entrance slit, and said optical element are integrally formed on an optical waveguide board, and a photoelectric conversion device substrate having said photoelectric conversion device formed thereon is mounted on the optical waveguide board.

2. A spectrophotometer comprising:

an optical waveguide;

a light entrance slit provided at an end face on the inner side of the optical waveguide, for bringing incident light into the optical waveguide;

an optical element provided at an end face on the inner side of said optical waveguide or at an interior of said optical waveguide, for separating the incident light brought in the optical waveguide into a spectrum; and a photoelectric conversion device provided at an end face on the inner side of said optical waveguide, for detecting the incident light separated into the spectrum at the optical element;

wherein said optical waveguide and said light entrance slit are integrally formed on an optical waveguide board, and an optical element substrate having said optical element formed thereon and a photoelectric conversion device substrate having said photoelectric conversion device formed thereon are mounted on the optical waveguide board.

3. The spectrophotometer according to claim 2, wherein said optical element is formed on a surface of said optical element substrate etched into a curved configuration.

4. The spectrophotometer according to claim 2, wherein said optical element is formed on a surface of a bendable optical element substrate and is mounted on said optical waveguide board with bending the optical element substrate.

5. The spectrophotometer according to claim 2, wherein said optical element is formed on an optical element substrate having a region of the same height as the height of said optical waveguide, at a surface of said region of the same height.

6. The spectrophotometer according to any one of claims 1 to 5, wherein said photoelectric conversion device is formed on a photoelectric conversion device substrate etched into a curved configuration.

7. The spectrophotometer according to any one of claims 1 to 5, wherein said photoelectric conversion device is formed on a surface of a bendable photoelectric conversion device substrate and is mounted on said optical waveguide board with bending the photoelectric conversion device substrate.

8. The spectrophotometer according to any one of claims 1 to 5, wherein said photoelectric conversion device is formed on a photoelectric conversion device substrate having a region of the same height as the height of said optical waveguide, at a surface of said region of the same height.

9. The spectrophotometer according to any one of claims 1 to 5, wherein a mounting portion for said photoelectric conversion device substrate of said optical waveguide board has a light receiving slit.

* * * * *